United States Patent
Hamrin

[15] 3,688,437
[45] Sept. 5, 1972

[54] PELLETS IN THE FORM OF FOAMED BODIES, AND METHODS FOR THE PREPARATION THEREOF

[72] Inventor: Björn Staffan Artur Hamrin, Bjärred, Sweden

[73] Assignee: Aktiebolaget Forenode Superfosfatfabrika, Landskrona, Sweden

[22] Filed: Jan. 22, 1971

[21] Appl. No.: 108,858

[30] Foreign Application Priority Data

Jan. 29, 1970 Sweden .....................1097/70

[52] U.S. Cl. ..................47/57.6, 252/350, 106/122, 117/3, 71/64, 264/45, 264/54
[51] Int. Cl. ...........................................A01n 21/02
[58] Field of Search...........47/57.6, DIG. 9; 252/350; 106/122; 117/3; 71/64; 264/41.55

[56] References Cited
UNITED STATES PATENTS

| | | |
|---|---|---|
| 2,957,834 | 10/1960 | Moller et al. ............47/DIG. 9 |
| 3,545,129 | 12/1970 | Schreiber et al............47/57.6 |
| 3,600,830 | 8/1971 | Hamrin......................47/57.6 |

*Primary Examiner*—Robert E. Bagwill
*Attorney*—Ralph E. Bucknam, Jesse D. Reingold and Henry A. Marzullo, Jr.

[57] ABSTRACT

A method for covering and enlarging individual seeds by a chemical process, comprising the steps of introducing said seeds into a first solution containing at least one gelatinizable compound and a catalyst for the decomposition of a further compound capable of giving off a gas, and then introducing the seeds thus treated into a second solution containing at least one salt causing gelatinization of said gelatinizable compound and said further compound for the simultaneous evolution of gas for inflating the individual seeds to foamed bodies.

8 Claims, 1 Drawing Figure

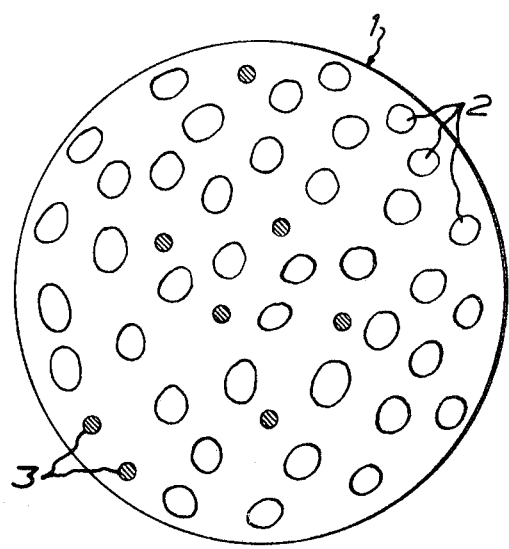

PELLETS IN THE FORM OF FOAMED BODIES, AND METHODS FOR THE PREPARATION THEREOF

This invention relates to porous pellets in the form of foamed bodies, and a method for the preparation thereof. A pellet prepared in accordance with this invention consists of a spherical foamed body within which one or more seeds are encapsulated. To prepare these spherical foamed bodies, the seeds are introduced under agitation into a container comprising a treatment solution of gelatine, possibly also agar-agar, and sodium alginate as well as manganese dioxide, whereupon the seeds so treated are transferred one by one from the container to a precipitation bath containing a solution of hydrogen peroxide and a salt which causes gelatinization and the formation of a water-insoluble alginate, the residence time in the bath being controlled according to the desired size of the resulting pellets which are of extremely uniform particle size and require no subsequent classification.

There are already known a number of pelletization methods where the seeds practically always are baked into a mass of neutral substances or nutrients. By these methods it was intended to protect the sown seeds against various forms of attack, to supply them with the required nutrients during germination, and to facilitate considerably the sowing by seed drills. Such known pelletization is carried out in conventional pelletizing machines or drums and is conducted until a pellet of the desired size has been formed. In actual practice, however, it was found that such mechanical pelletization may damage the seed, and that the addition of nutrients to the pellet does not appreciably enhance the germination capacity. Nevertheless, most seed is still being pelletized by such prior art methods, and this would seem due almost exclusively to the fact that the seeds can be sown mechanically one by one whereby int. al. a later thinning is avoided.

It is also known to encapsulate individual seeds in hollow pellets which, however, also are prepared by mechanical means, for which reason the seed also in this case is subject to damage during the mechanical preparation of the pellet.

By the present invention, all mechanical damage to the seed is avoided, and the method of this invention is particularly useful for very small seed which, in actual practice, cannot very well be pelletized by prior art methods.

A further advantage of this invention is that the foamed body within which the seed is encapsulated, is a natural product, preferably calcium alginate, although of course also other similar substances may be used.

An example of the pelletization of small seed is given in the following.

The seeds are introduced into a container, the bottom of which has a multiplicity of holes having a diameter of 1–3 mm. The container holds a processing solution comprising 0.5–2.0 percent gelatine, preferably 1 percent, 0.5–1.0 percent agar-agar, preferably 1 percent, 0.5–2.0 percent sodium alginate, preferably 1 percent and 0.01–0.05 percent manganese dioxide, preferably 0.02 percent. The seeds drop through the holes in the container bottom into a precipitation bath containing 0.5–1.5 percent hydrogen peroxide, preferably 1 percent, and, as precipitation salt, calcium nitrate in an amount of 5–15 percent, preferably 10 percent. The manganese dioxide and the hydrogen peroxide cause a rapid swelling of the seeds which rise to the surface where they are skimmed and then washed and dried.

The size of the resulting pellet depends upon the residence time in the precipitation bath.

To further illustrate the present invention, reference is made to the accompanying drawing which shows a pellet 1 consisting of a spherical body containing a very large number of pores 2 between which the seeds 3 are enclosed in a network formed of calcium alginate and precipitated gelatin. In the illustrated embodiment, a large number of very small seeds are encapsulated in a single foamed body, which is often desirable in view of the germination capacity of different seed types. Plants that have been raised in this manner can be readily separated for subsequent bedding-out. However, the method can also be so conducted, and this applies especially to larger seeds, that each foamed body contains but one single seed.

When the seed coated with the gelatine, alginate and manganese dioxide enters the precipitation solution, two reactions occur at the same time, viz. a gelatinization and conversion of the alginate into the insoluble calcium alginate, and also a liberation of oxygen from the hydrogen peroxide upon contact with the manganese dioxide on the seed, the liberated oxygen gas inflating or foaming the gelatinized mass around the seeds. This results in the foamed body which, owing to its specific gravity, quickly rises to the surface and therefore is easily skimmed off.

It will be obvious that a great number of chemical substances may be utilized which in combination provide a similar effect. The invention therefore is not limited to the above-mentioned substances, and the expert can easily select other combinations.

What I claim and desire to secure by Letters Patent is:

1. A method of preparing porous pellets in the form of foamed bodies from seeds which comprises introducing said seeds into a first zone containing a solution of at least one water-soluble substance capable of being converted into an insoluble substance, gelatin and a catalyst, capable of catalyzing the decomposition of a gas-generating substance, introducing the said seeds coated with said solution into a precipitation bath containing a precipitant for said water-soluble substance, and capable of causing gelatinization, said bath containing a compound capable of generating a gas under the action of said catalyst, whereby gelatin gelatinizes, said soluble substance is converted into an insoluble substance, gas is generated, the seeds swell, the seeds rise to the surface and they are skimmed, washed and dried, the residence time in the bath being determined according to the desired size of the resulting pellets.

2. A method according to claim 1 wherein the seeds coated with said solution are dropped through a plurality of openings provided at the bottom of said first zone, said openings having a diameter of 1–3 mm, into the precipitation bath.

3. A method according to claim 1 wherein said first zone contains gelatin, a solution of a soluble alginate salt, and said catalyst.

4. A method according to claim 1 wherein said solution in said first zone contains 0.5–2 percent gelatin, 0.5–1 percent agar-agar, the substance capable of being converted into an insoluble substance is sodium alginate in an amount of 0.5–2 percent 2 the catalyst is manganese dioxide in an amount of 0.01–0.05 percent.

5. A method according to claim 1 wherein in the precipitation bath, the precipitant is calcium nitrate in an amount of 5–15 percent and the substance capable of generating gas is hydrogen peroxide in an amount of 0.5–1.5 percent.

6. A method according to claim 1 wherein the seeds are transferred from said first zone to said precipitation bath one by one.

7. A porous pellet comprised of a spherical foamed body within which at least one seed is encapsulated in a network of at least one water-insoluble substance and gelatin.

8. A pellet according to claim 7 wherein said water-insoluble substance is calcium alginate.

* * * * *